(No Model.)
H. C. HODGES.
JOINT FOR CROSSING PARTS OF CORRUGATED METAL.
No. 362,008. Patented Apr. 26, 1887.
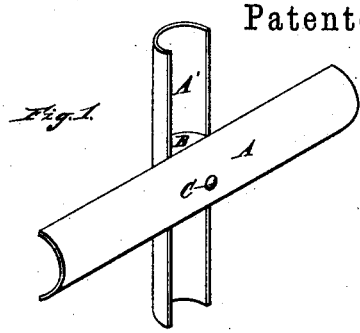
Fig. 1.
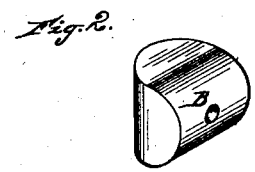
Fig. 2.
Fig. 3.
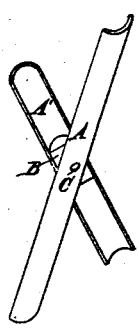 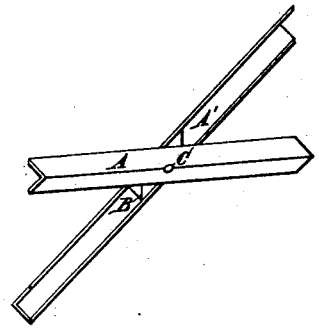 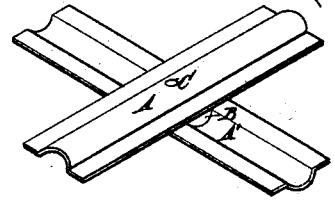
  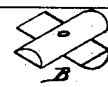
Fig. 4.
    
Fig. 5.
WITNESSES
John E. Wiles.
M. B. O'Dogherty.
INVENTOR
Henry C. Hodges
By W. W. Beggs
Attorney

UNITED STATES PATENT OFFICE.

HENRY C. HODGES, OF DETROIT, MICHIGAN.

JOINT FOR CROSSING PARTS OF CORRUGATED METAL.

SPECIFICATION forming part of Letters Patent No. 362,008, dated April 26, 1887.

Application filed February 15, 1887. Serial No. 227,718. (No model.)

*To all whom it may concern:*

Be it known that I, HENRY C. HODGES, of Detroit, county of Wayne, State of Michigan, have invented a new and useful Improvement in Joints for Crossing Parts of Corrugated Metal; and declare the following to be a full, clear, and exact description of the invention, such as will enable others skilled in the art to which it pertains to make and use it, reference being had to the accompanying drawings, which form a part of this specification.

My invention consists of the combinations of devices and appliances hereinafter specified, and more particularly pointed out in the claims.

In the drawings, Figure 1 is a perspective view of a joint embodying my invention. Fig. 2 is a separate view of the filling-piece at the joint. Fig. 3 shows different forms of joints, and in Fig. 4, beneath, are corresponding filling-pieces for the joints. Fig. 5 shows various forms of corrugated metal which may be employed with corresponding joint-pieces.

It is the purpose of my invention to provide a strong and substantial joint for employment in connection with corrugated-metal structures at the point where such corrugated metal parts are caused to cross each other and require to be fastened together.

It is of course apparent that where two pieces of corrugated metal are brought across each other and are fastened simply by a rivet or bolt the structure is not materially strengthened at the joint, because the metal, being light, cannot stand the tightening strain of a bolt. Moreover, the whole strain at this point is thrown directly upon the bolts without the bolts having any intermediate support. By my invention, however, the joint is made as strong as or stronger than any other part of the structure.

In carrying out my invention, A and A' represent any two corrugated-metal parts of any bridge, truss, frame-work, or other structure.

B is a filling-piece adapted upon its exterior surface to closely fit within the corresponding surfaces of the parts A and A'.

C is a bolt or rivet. It will be observed that the corrugated metal comes down over the filling-piece, so as to prevent any lateral strain upon the bolt, and the filling-piece serves to relieve the corrugated metal from the strain of the bolt. The bolt itself is almost wholly relieved from strain, because it is supported by the filling-piece throughout its whole length, and the filling-piece B is adapted to fill the channel in both the parts A and A'. These parts A A' are thus held rigidly, while the filling-piece prevents any displacement of and serves to brace the parts A A'.

The filling-piece B may be so cast or shaped as to correspond with any particular angle at which the parts A cross each other. Several of these different shapes are shown in Fig. 4, and as shown in Fig. 5 it makes no difference what may be the cross-sectional shape of the corrugated metal the filling-piece can be made to correspond.

It is apparent that this improvement in the manner of making the joints will enable the constructer to employ light corrugated metal in many localities where it could ordinarily not otherwise be employed—as, for instance, in bridges, trusses, boat-frames, and in a vast variety of other structures. There is also by this improvement provided a rigidity at these points by the employment of a single bolt or rivet such as it is impossible to obtain by the usual forms of joints, where the crossing members A A' are simply laid together and united by bolts or rivets. All flexing or rotation of the parts A A' about the bolt or rivet as a pivot is entirely overcome, thus removing a great source of wear in structures of this kind and obviating the liability of becoming loose and shaky.

The filling-piece B may be cast solid in the shape required, or it may be cast hollow, thereby lightening the structure and saving metal; or, if great strength and tenacity are required, it may be made in the form of a drop-forging or of malleable iron, and when of malleable iron may be either hollow or solid.

Instead of the filling-piece B being formed with a through-opening for the passage of the bolt or rivet, the piece itself may, especially for light work, be formed of wrought or malleable metal, with rivets projecting from its two sides and constituting a part of the piece, which rivets may be passed through holes in the corrugated metal and be headed down upon the outside; and I would have it understood that such a construction is contemplated as the equivalent of the structures described in the claims.

What I claim is—

1. An improved joint for use at the crossing of corrugated metal parts, consisting of the combination, with the corrugated metal parts A A', of the filling-piece B, said filling-piece dressed, substantially as described, to conform to the interior surfaces of both said parts, and means for uniting the three, substantially as and for the purpose described.

2. An improved joint for use at the crossing of corrugated metal parts, consisting of the combination, with the corrugated metal parts A A', of the filling-piece B, said filling-piece dressed, substantially as described, to conform to the interior surfaces of both said parts, and a uniting bolt or rivet, substantially as and for the purpose set forth.

3. A joint for the crossing parts of corrugated metal, consisting of the combination, with the said parts A A', of the filling-piece B, said filling-piece made to conform to and fit the inner surfaces of both said parts A and A', the same made hollow and the whole united by a bolt or rivet, substantially as described.

4. The filling piece B, provided with an opening for the passage of a bolt or rivet, and shaped upon its two sides to correspond with and fit into the channels of two crossing parts of corrugated metal, substantially as and for the purpose described.

In testimony whereof I sign this specification in the presence of two witnesses.

HENRY C. HODGES.

Witnesses:
N. S. WRIGHT,
M. B. O'DOGHERTY.